United States Patent [19]

Hosokawa et al.

[11] Patent Number: 5,396,298
[45] Date of Patent: Mar. 7, 1995

[54] VIDEO SIGNAL PROCESSING APPARATUS FOR PERFORMING MAGNIFICATION PROCESSING

[75] Inventors: Tatsuhiro Hosokawa; Akira Okutani, both of Ibaraki; Hitomi Kaji, Hirakata, all of Japan

[73] Assignee: Matsushita Electric Industrial Co., Ltd., Kadoma, Japan

[21] Appl. No.: 124,963

[22] Filed: Sep. 21, 1993

[30] Foreign Application Priority Data

Sep. 21, 1992 [JP] Japan .................................. 4-250865

[51] Int. Cl.⁶ .......................................... H04N 5/262
[52] U.S. Cl. .................................. 348/581; 348/452; 348/383; 348/561
[58] Field of Search ............... 348/581, 582, 561, 562, 348/704, 705, 706, 448, 452, 240, 383; H04N 5/262, 5/44, 9/74; 345/131, 138; 382/47

[56] References Cited

U.S. PATENT DOCUMENTS

| | | | |
|---|---|---|---|
| 4,400,719 | 8/1983 | Powers | 348/450 |
| 4,679,084 | 7/1987 | Topper et al. | 348/448 |
| 4,853,765 | 8/1989 | Katsumata et al. | 348/451 |
| 4,868,656 | 9/1989 | Geiger et al. | 348/448 |
| 5,029,006 | 7/1991 | Katsumata et al. | 348/581 |

FOREIGN PATENT DOCUMENTS

| | | | |
|---|---|---|---|
| 59-40772 | 6/1984 | Japan | H04N 5/02 |
| 59-40773 | 6/1984 | Japan | H04N 5/02 |
| 1235483 | 9/1989 | Japan | H04N 5/262 |
| 4134980 | 5/1992 | Japan | H04N 5/262 |

Primary Examiner—James J. Groody
Assistant Examiner—Safet Metjahic
Attorney, Agent, or Firm—Ratner & Prestia

[57] ABSTRACT

A video signal processing apparatus includes an A/D converter for converting an analog video signal to a digital video signal. Also included is a 3-dimensional scanning line interpolating unit for outputting an original video signal and an interpolating signal which is synchronized with the original video signal and which includes interpolated scanning lines. A magnification processing unit and a switching signal generating unit are also provided. The switching signal generating unit is for generating a switching signal corresponding to a vertical magnifying power. Further, a switching unit is included for switching between the original video signal and the interpolated video signal according to the switching signal and for outputting the switched signal. The magnification processing unit includes a first field memory for storing the original video signal, a second field memory for storing the interpolating video signal, and a controller for programming the first and second field memories and for providing the programmed vertical magnifying power to a switching signal generating unit.

2 Claims, 9 Drawing Sheets

VIDEO SIGNAL PROCESSING APPARATUS FOR PERFORMING MAGNIFICATION PROCESSING

BACKGROUND OF THE INVENTION

1. Field of the Invention

This invention relates to a video signal processing apparatus which divides a video signal into multiple video signals and performs magnification processing. The invention is employed in TV walls which display one picture on a big screen composed of plural video monitors.

2. Description of the Prior Art

Video monitors used for a television wall are changing from direct view tube type to projection type. Furthermore, the TV screens are becoming bigger. For a big screen, a video signal processing technique has been developed which divides a video signal into multiple video signals, performs magnification processing, and displays the video signal on a big screen composed of a combination of plural video monitors. As screen size increases, a video signal processing apparatus with a higher quality video signal is required.

FIG. 1 is a block diagram of a video signal processing apparatus in accordance with the prior art. A/D converter 1 converts an analog video signal into a digital video signal. Field memory 2 stores a digital video signal of one field. In an exemplary embodiment of the present invention, a video memory is used which can process a video signal so that an arbitrary domain from an arbitrary position in the field can be magnified with an arbitrary integer magnifying power by programming (e.g. Matsushita Electronic Corp. type MN4711F). Controller 3 may be a microcomputer. The controller 3 programs the field memory 2 and plays a part in magnification processing. Magnification processing means 4 includes memory 2 and controller 3.

FIG. 2(e) is an image of a video signal stored in the field memory 2. A digital video signal of a certain point on the m-th scanning line in the field is defined as Rm and a digital video signal of the point beneath the above mentioned point on the next m1-th scanning line is defined as Rm1. The sizes of these digital video signals which are in a positional relation of on-beneath are shown by a bar graph in FIG. 2(a). In FIG. 1, by programing the field memory 2 with the controller 3 and repeating vertical addressing n times, a video signal in which vertical data is magnified by n-power is obtained. FIGS. 2(b), 2(c) and 2(d) show the cases of 2-power magnification, 3-power magnification, and 4-power magnification, respectively.

In the prior art, however, because only signals with the same data are repetitively displayed, the picture becomes mosaiclike and the picture quality deteriorates.

SUMMARY OF THE INVENTION

A video signal processing apparatus in accordance with a first exemplary embodiment of the present invention comprises, A/D converter means for converting an analog video signal to a digital video signal, three dimensional scanning line interpolating means which interpolates scanning lines in three dimension from the converted digital video signal and generates an interpolating video signal, magnification processing means, switching signal generating means for generating a switching signal to switch between a magnified original video signal and a magnified interpolated video signal according to a vertical magnifying power, and switching means for switching between the magnified original video signal and the magnified interpolated video signal according to the switching signal from the switching signal generating means and for outputting a magnified video signal.

The magnification processing means comprises, a first field memory for storing an original video signal, a second field memory for storing the interpolating video signal, and a controller which controls to process a video signal so that an arbitrary domain in the first and the second field memories from an arbitrary position is magnified with an arbitrary integer magnifying power.

A video signal processing apparatus in accordance with a second exemplary embodiment of the present invention features a video signal processing apparatus which in some ways is similar to the one described with reference to the first exemplary embodiment of the present invention. However, the switching signal is fixed and only an original signal without magnification processing is outputted when a vertical magnifying power is 1.

A video signal processing apparatus in accordance with a third exemplary embodiment of the present invention comprises, A/D converter means for converting an analog video signal to a digital video signal, three dimensional scanning line interpolating means which interpolates scanning lines in three dimension from the converted digital video signal and generates an interpolating signal, magnification processing means, switching signal generating means for generating a switching signal to switch between a magnified original video signal and a magnified interpolating video signal according to a vertical magnifying power, first switching means for switching between the magnified original video signal and the magnified interpolating video signal according to the switching signal from the switching signal generating means and for outputting the magnified video signal, second switching means for switching between the magnified original video signal and the magnified interpolating video signal according to the switching signal and for outputting a different signal from the output signal of the first switching means, subtracting means for subtracting the output of the first switching means from the output of the second switching means, coefficient generating means for generating a coefficient decided by the vertical magnifying power and the scanning line position, multiplying means for multiplying an output of the subtracting means and an output of the coefficient generating means, and adding means for adding an output of the first switching means and an output of the multiplying means. The magnification processing means comprises, a first field memory for storing an original video signal, a second field memory for storing an interpolating video signal, and a controller which controls processing of a video signal so that an arbitrary domain in the first and the second field memories from an arbitrary position is magnified with an arbitrary integer magnifying power.

A video signal processing apparatus in accordance with a fourth exemplary embodiment of the present invention features a video signal processing apparatus which in some ways is similar to the one described with reference to the third exemplary embodiment of the present invention. However, means for switching an output of the multiplying means so that it is always zero is provided.

According to the first and the second exemplary embodiments of the present invention, vertical resolution is improved and picture quality of the magnification processed video signal is improved. This is because an original video signal and an interpolating video signal which is scanning line interpolated with three dimensions employed in a clear-vision system are switched between each other and displayed.

According to the second exemplary embodiment of the present invention, switching can be achieved without loose synchronization when switching from a magnified picture to a standard picture, and vice versa.

According to the third and the fourth exemplary embodiments of the present invention, a vertical stepping signal is smoothed. This is because a signal is interpolated linearly between an original signal and an interpolating signal by operation processing. As a result, a more natural magnified picture is reproduced.

According to the fourth exemplary embodiments of the present invention, a more natural magnified picture can be obtained by linear interpolation. Furthermore, a sharp picture can be obtained by rejecting linear interpolation.

DETAILED DESCRIPTION OF THE INVENTION (First Exemplary Embodiment)

Figure 1:
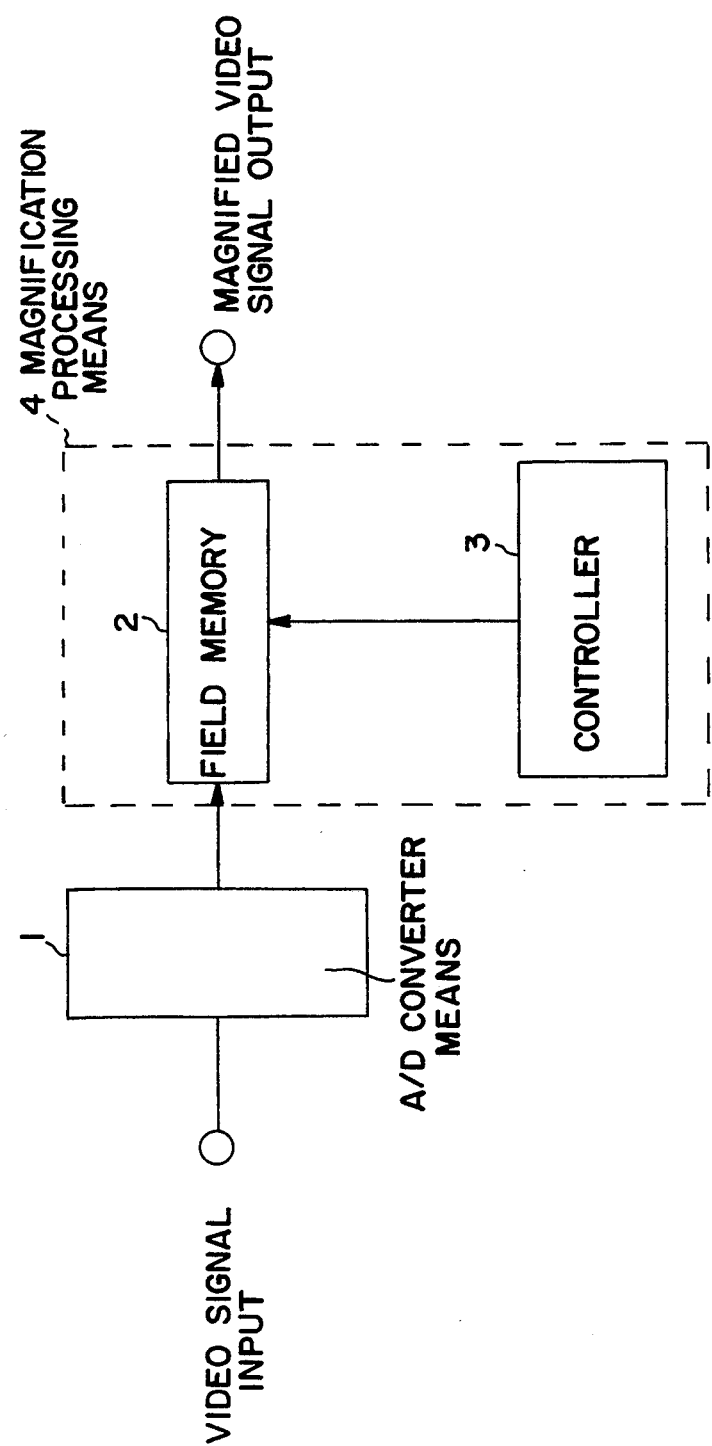
FIG. 1 is a block diagram of a video signal processing apparatus in accordance with the prior art.
Figure 2A:
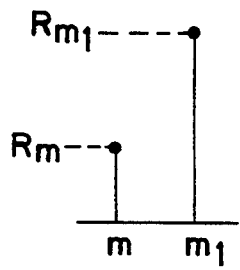
FIGS. 2(a)-2(e) are graphs which illustrate signal processing procedures. These graphs are useful for explaining the performance of a video signal processing apparatus in accordance with the prior art.
Figure 2B:
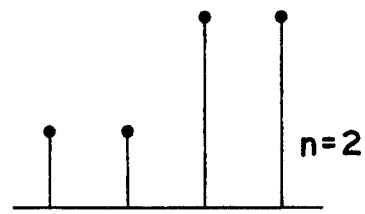
Figure 2C:
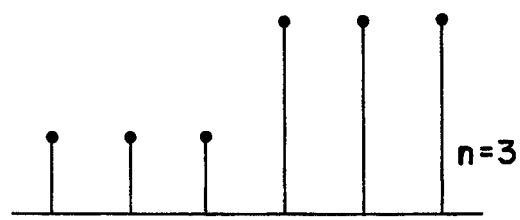
Figure 2D:
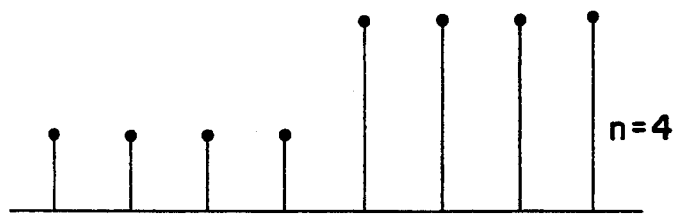
Figure 2E:
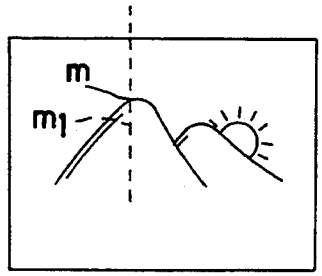
Figure 3:
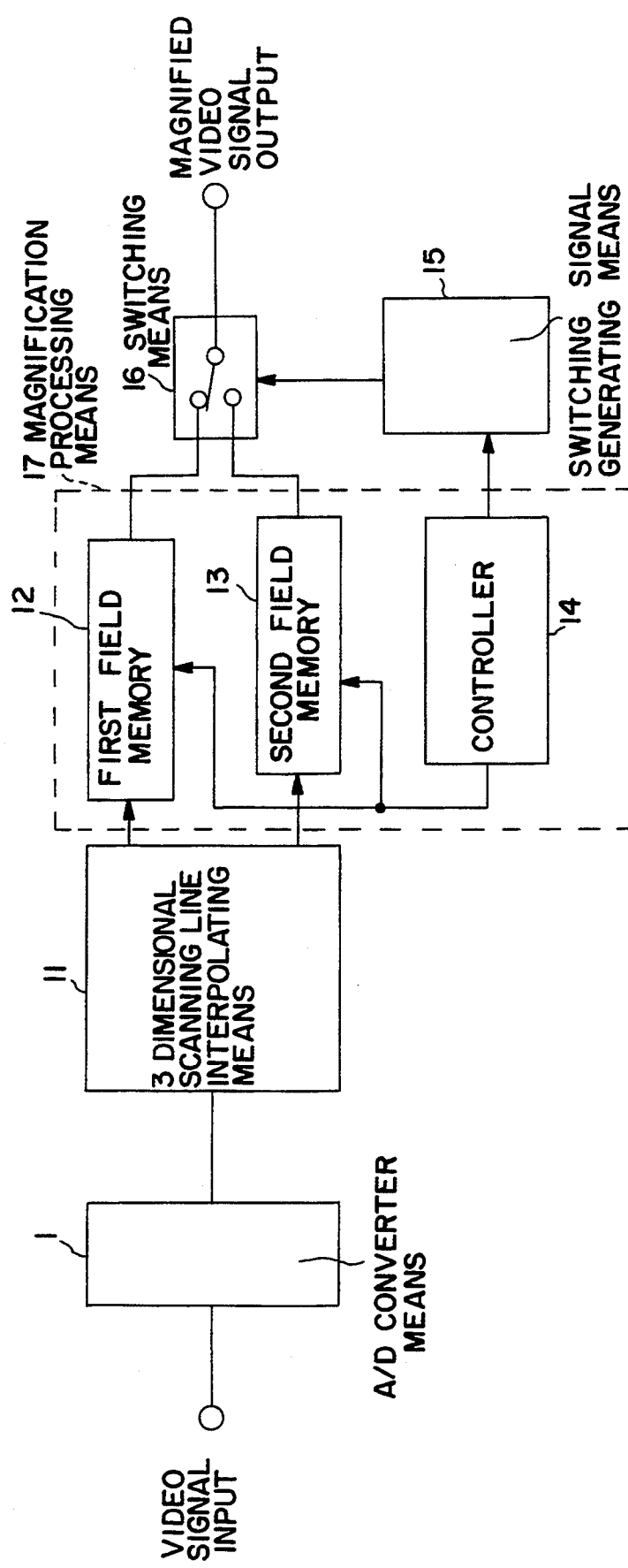
FIG. 3 is a block diagram of a video signal processing apparatus in accordance with a first exemplary embodiment and a second exemplary embodiment of the present invention.

FIG. 3 is a block diagram of a video signal processing apparatus in accordance with a first exemplary embodiment of the present invention. A/D converter 1 converts an analog video signal into a digital video signal. Three dimensional scanning line interpolating means 11 outputs an original video signal and a scanning line interpolating video signal synchronizing to the original video signal. As for video information of a certain dot on the screen, positional dimension (horizontal and vertical) is regarded as two dimensional and a time dimension of the dot in the preceding field is regarded as three dimensional. First field memory 12 stores the original video signal and second field memory 13 stores the interpolating video signal. Controller 14 programs the first field memory 12 and the second field memory 13 and outputs a programmed vertical magnifying power to a switching signal generating means 15. A microcomputer is usually employed for a controller 14. Magnification processing means 17 is composed of the first field memory 12, the second field memory 13 and the controller 14 and performs processing so that an arbitrary domain from an arbitrary position in the first field memory 12 and in the second field memory 13 is magnified with an arbitrary integer magnifying power. Switching signal generating means 15 generates a switching signal according to a vertical magnifying power. A switching means 16 switches between the original video signal and the interpolated video signal by the switching signal.

An analog video signal is converted to a digital video signal at the A/D converter 1. The digital video signal output of the A/D converter 1 is inputted to the three dimensional scanning line interpolating means 11. The three dimensional scanning line interpolating means 11 detects movement of the picture and outputs an interpolating video signal, which is interpolated scanning lines with the signals of the upper and lower scanning lines and the preceding field, and an original video signal, which is synchronized with the interpolating video signal. These synchronized original and interpolating video signals are stored in the field memories 12 and 13, respectively.

Exclusive memories for a video signal which magnifies an arbitrary domain in the field from an arbitrary position in the field with an arbitrary integer magnifying power by programming are employed for the field memories 12 and 13, as well as in the prior art. The controller 14 specifies a magnifying power and a readout position of the magnified signal by setting registers in the field memories 12 and 13 and outputs the vertical magnifying power n to the switching signal generating means 15.

Figure 4:
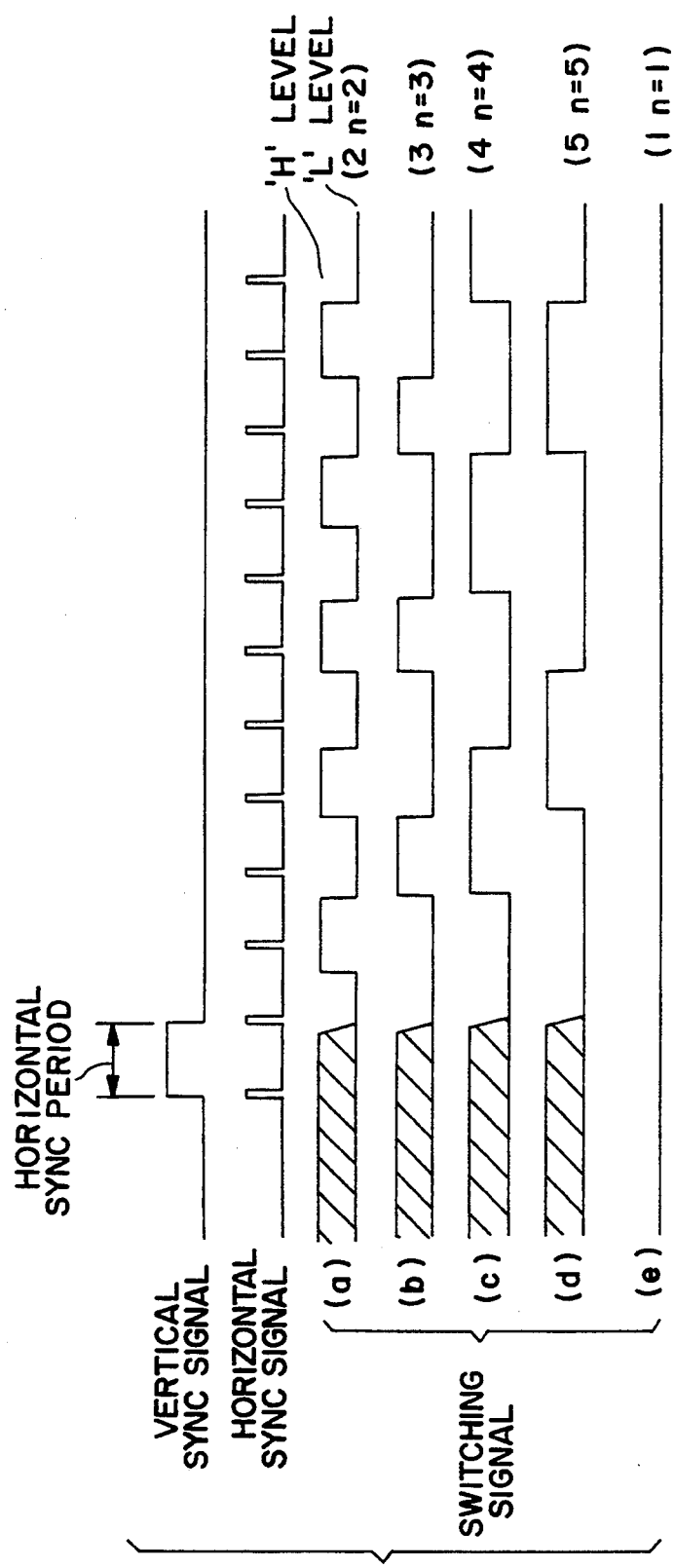
FIG. 4 is a timing chart for explaining the performance of a video signal processing apparatus in accordance with a first exemplary embodiment and a second exemplary embodiment of the present invention.

The switching signal generating means 15 outputs a switching signal according to a magnifying power n and its performance is illustrated in FIG. 4. In FIG. 4, (a), (b), (c), (d) and (e) are switching signals in the case of a magnifying power n=2, 3, 4, 5 and 1, respectively. An original video signal is outputted when the switching signal level is 'L' level and an interpolating signal is outputted when the switching signal level is 'H' level, where 'L' and 'H' stand for Low and High, respectively. The circuit is designed so that in the case in which n is an even number, the switching signal holds 'H' level and 'L' level during every (n/2)×(horizontal scanning period) and in the case in which n is an odd number, the switching signal holds 'L' level during {(n+1)/2)}×(horizontal scanning period) and holds 'H' level during {(n−1)/2)}×(horizontal scanning period).

According to this switching signals the switching means 16 switches between an original video signal and an interpolating video signal and outputs a magnified video signal, which is interpolated.

Figure 5A:
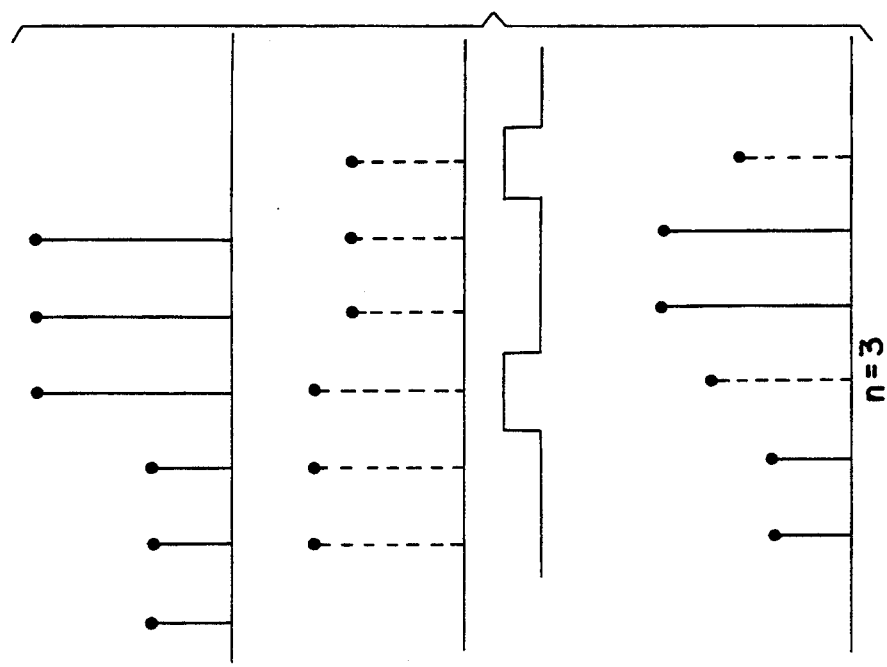
FIGS. 5(a)-5(c) are graphs which illustrate signal processing procedures. These graphs are useful for explaining the performance of a video signal processing apparatus in accordance with a first exemplary embodiment and a second exemplary embodiment of the present invention.
Figure 5B:
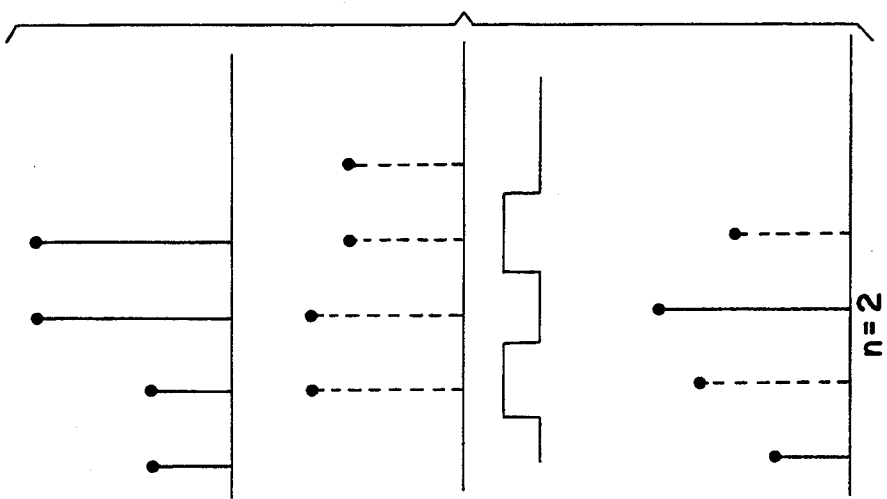
Figure 5C:
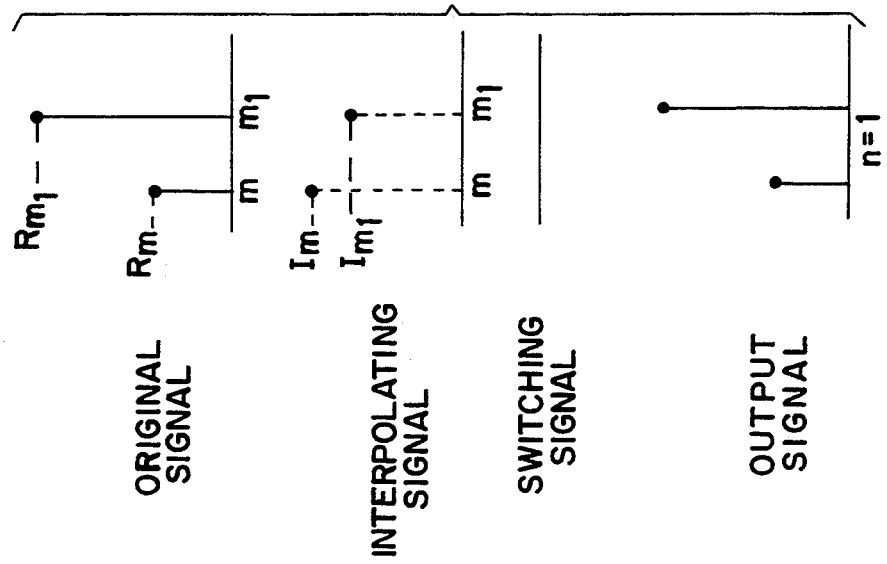

In FIGS. 5(a)-(c), as well as in FIGS. 2(a)-(d), a digital video signal at a certain point on the m-th scanning line in a field is defined as Rm and a digital video signal at the point which is just beneath the above mentioned point on the m1-th scanning line is defined as Rm1. The original video signal and the interpolating video signal which are synchronized with each other are defined as Im and Im1, respectively and they are indicated as broken lines. FIGS. 5(a)-(c) show the cases in which the magnifying power of n=1, 2 and 3, respectively. As shown in FIGS. 5(a)-(c), when the registers in the first field memory 12 and in the second field memory 13 are set, the controller 14 is set so that the magnifying power takes the same value but as for a read-out position the interpolating signal is read out with some delay time. The delay amount is set to be n/2 if n is even and (n−1)/2×(horizontal scanning period) if n is odd.

According to the first exemplary embodiment, by providing with a three dimensional scanning line interpolating means 11, a first field memory 12 for storing an original video signal, a second field memory 13 for storing an interpolating video signal, and switching means 16 for switching between a magnified original signal and a magnified interpolated signal, the original video signal and the interpolating video signal can be displayed alternately and, as a result, a magnified picture with improved vertical resolution can be obtained.

(Second Exemplary Embodiment)

The second exemplary embodiment of the present invention is in some ways similar to the first exemplary embodiment of the present invention. The second exemplary embodiment further includes means to output an input video signal without magnification processing. Its block diagram is shown in FIG. 3. As its performance is similar to the first exemplary embodiment, a detailed explanation is omitted. However, the registers in the first field memory 12 and the second field memory 13 are set so that a magnifying power n=1 and the output of the switching signal generating means 15 is always 'L' level when n=1. The performance is the same as those shown in FIG. 4(e) and FIG. 5(a). When the vertical magnifying power n=1, the switching signal is fixed and only the original video signal without magnification processing is outputted.

According to the second exemplary embodiment, a standard picture, which is the original input video signal and without magnification processing, can be displayed. Moreover, switching between a magnified picture and a standard picture can be done without loosing synchronization because of the same delay time between in the first field memory 12 and in the second field memory 13.

(Third Exemplary Embodiment)

Figure 6:
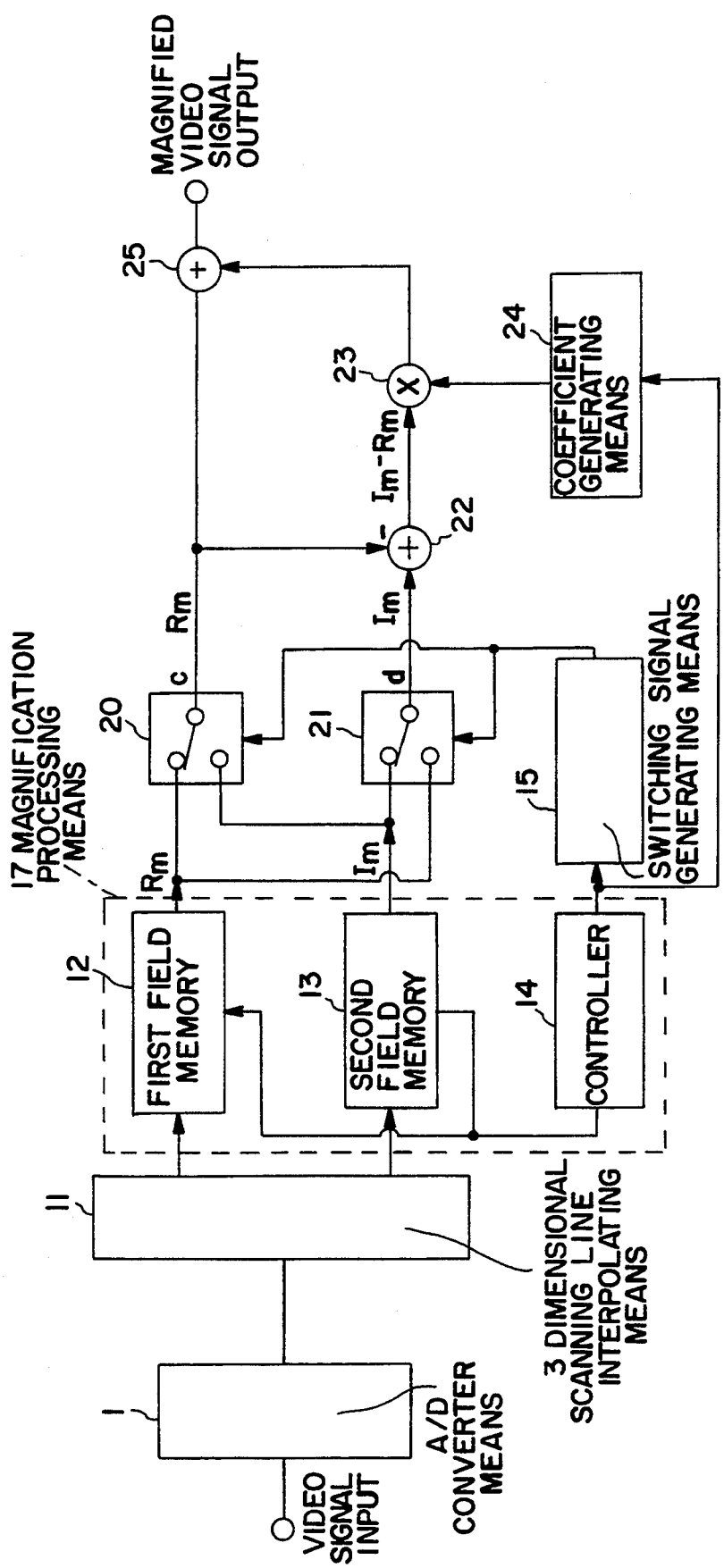
FIG. 6 is a block diagram of a video signal processing apparatus in accordance with a third exemplary embodiment of the present invention.

A third exemplary embodiment of the present invention is explained in the following, referring to FIG. 6, FIG. 7 and FIG. 8. The third exemplary embodiment includes A/D converter 1, three dimensional scanning line interpolating means 11, first field memory 12, second field memory 13, and controller 14. Magnification processing means 17 is composed of the first field memory 12, the second field memory 13, and the controller 14. Switching signal generating means 15 is also included. The above units are similar to those shown in FIG. 3 and a detailed explanation is omitted.

Some of the ways that the third embodiment differs from the other embodiments are as follows.

Switching means 16 is removed. A first switching means 20 switches between a magnified original signal outputted from the first field memory 12 and a magnified interpolating signal outputted from the second field memory 13. A second switching means 21 switches between the magnified original video signal and the magnified interpolating video signal and for obtaining a different signal from the output signal from the first switching means 20. Subtracting means 22 subtracts the output of the first switching means 20 from the output of the second switching means 21. Coefficient generating means 24 generates a coefficient specified by the vertical magnifying power and the scanning line position. Multiplying means 23 multiplies the output of the subtracting means 22 and the output of the coefficient generating means 24. Adding means 25 adds the output of the first switching means 20 and the output of the multiplying means 23.

Figure 7:
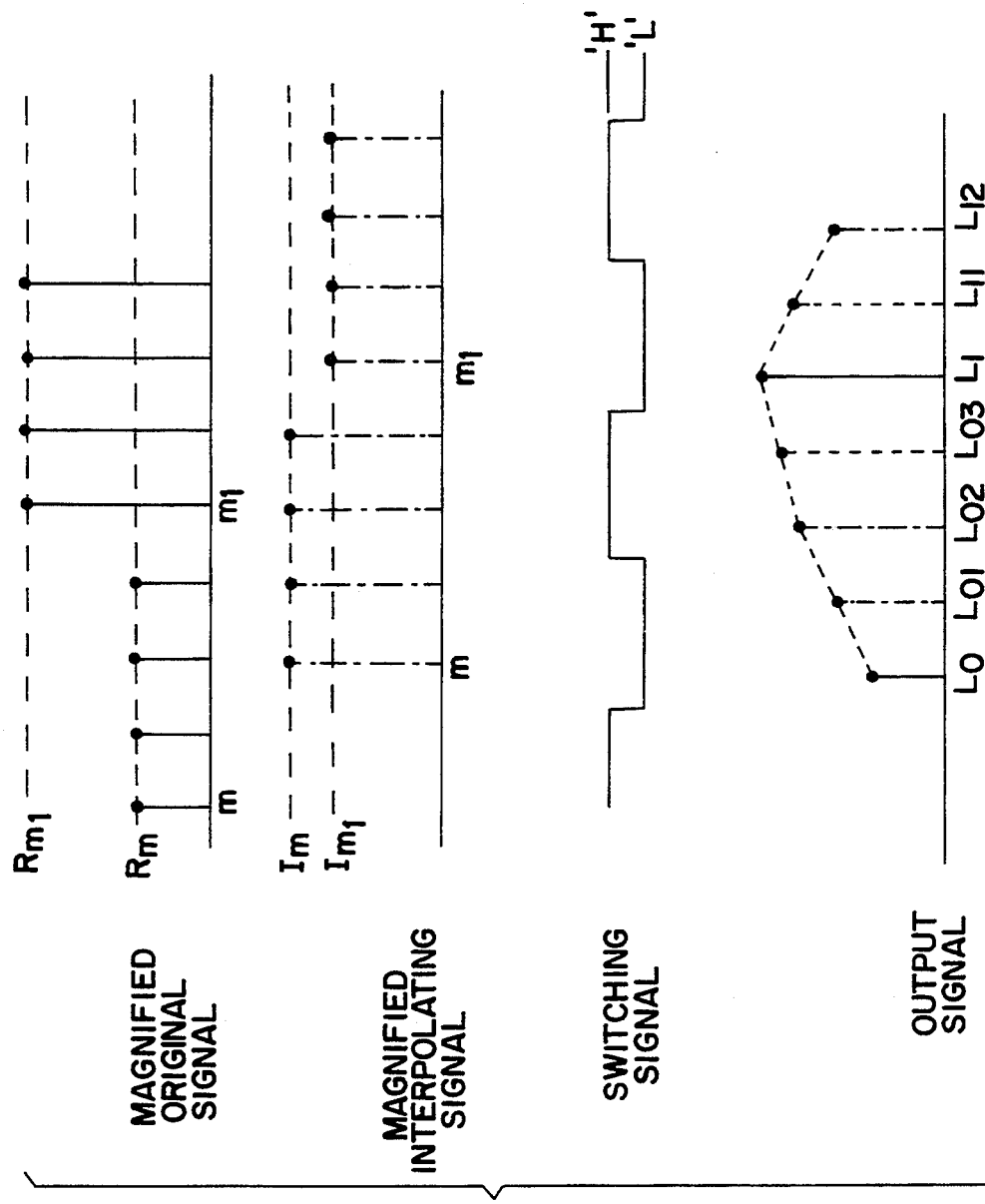
FIG. 7 are graphs which illustrate signal processing procedures. These graphs are useful for explaining the performance of a video signal processing apparatus in accordance with a third exemplary embodiment of the present invention.
Figure 8:
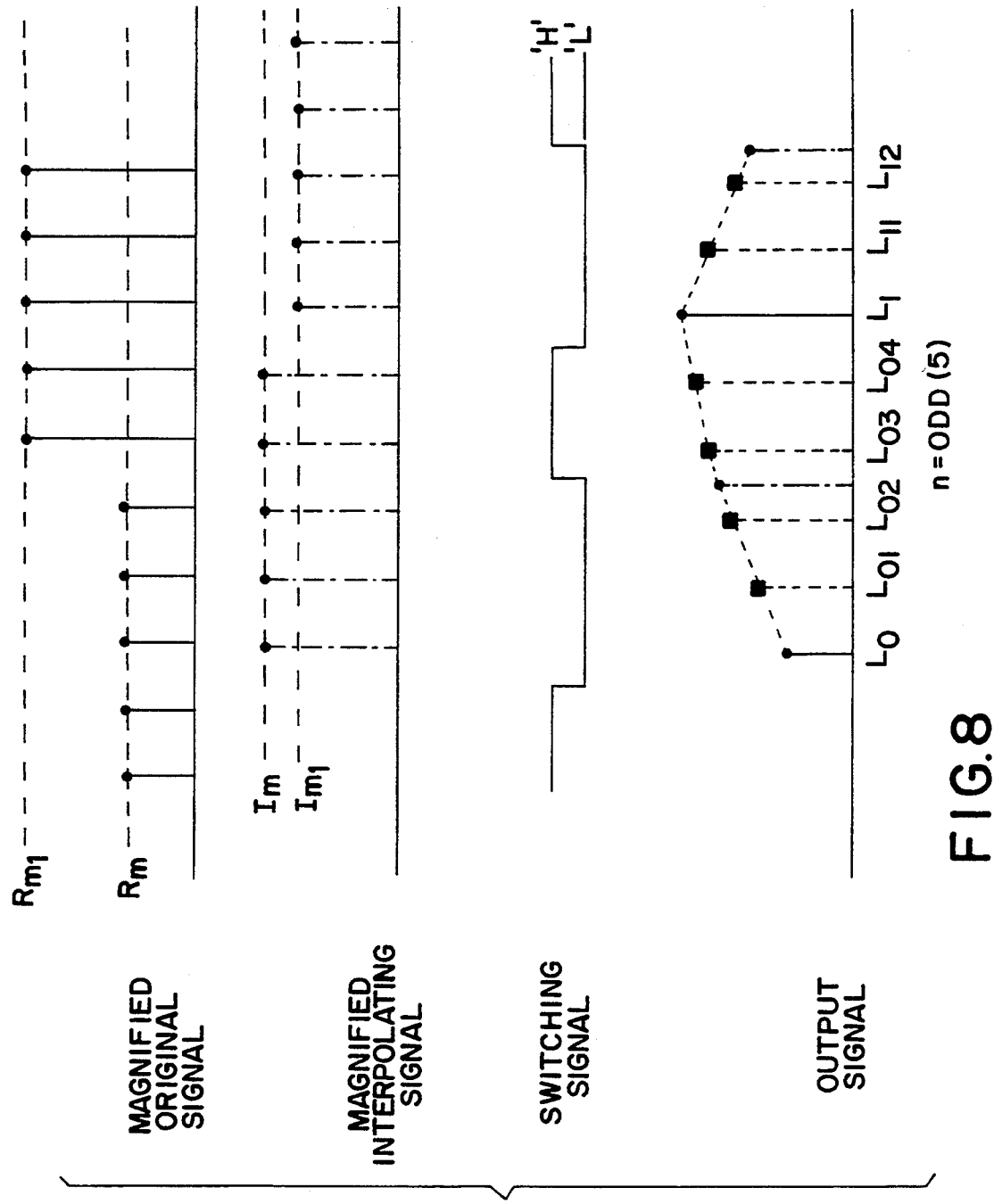
FIG. 8 are graphs which illustrate signal processing procedures. These graphs are useful for explaining the performance of a video signal processing apparatus in accordance with a third exemplary embodiment of the present invention.

In FIG. 7 and FIG. 8, a digital video signal at a certain point on the m-th scanning line in a field is defined as Rm, a digital video signal at the point which is just beneath the above mentioned point on the m1-th scanning line is defined as Rm1, as well as in FIG. 5. The original video signal and the interpolating video signal which are synchronized with each other are defined as Im and Im1, respectively and they are indicated as one dot broken lines. FIG. 7 shows an example in which a vertical magnifying power is an even number, i.e. n=4. FIG. 8 shows an example in which a vertical magnifying power is an odd number, i.e. n=5.

In FIG. 7, while the switching signal from the switching signal generating means 15 is on 'L' level, the output of the first field memory 12 is an original video signal Rm and the output of the second field memory 13 is an interpolating video signal Im. As the switching signal is on 'L' level, the first switching means 20 outputs the output of the first field memory 12, i.e. Rm. The second switching means 21 outputs the output of the second field memory 13, i.e. Im. Therefore, the output of the subtracting means 22 is (Im−Rm). If the horizontal scanning line number of the signal is $L_0$ and the output of the coefficient generating means 24 is designed to be zero, the output of the multiplying means 23 becomes zero and the magnified video signal output from the adding means 25 becomes Rm.

For the next horizontal scanning line, which number is $L_{01}$, the output of the coefficient generating means 24 is desirably ½. The output of the first field memory 12 is Rm and the output of the second field memory 13 is Im. The output of the first switching means 20 is Rm and the output of the second switching means 21 is Im. The output of the subtracting means 22 is (Im−Rm). The output of the multiplying means 23 is (Im−Rm)/2 and the magnified video signal output from the adding means 25 is Rm+(Im−Rm)/2.

For the horizontal scanning line number, $L_{02}$, the output of the coefficient generating means 24 is designed to be zero. As the switching signal from the switching signal generating means 15 is on 'H' level, the output of the first switching means 20 is the output of the second field memory 13 Im and the output of the second switching means 21 is the output of the first field memory 12 Rm1. The output of the multiplying means 23 is zero and the magnified video signal output from the adding means 25 is Im.

Further, for the horizontal scanning line number L03, the output of the coefficient generating means 24 is designed to be ½ and the switching signal is on 'H' level. The magnified video signal output is Im+(Rm1−Im)/2.

For the horizontal scanning line number L1, the output of the coefficient generating means 24 is designed to be zero and the switching signal is on 'L' level. The magnified video signal output is Rm1.

For the horizontal scanning line number L1, the output of the coefficient generating means 24 is designed to be ½ and the switching signal is on 'L' level. The magnified video signal output is Rm1+(Im−Rm1)/2.

The scanning line number, the coefficient value and the value of the magnified video signal output are shown in TABLE 1.

TABLE 1

| scanning line no. | coefficient | magnified video signal |
|---|---|---|
| $L_0$ | 0 | Rm |
| $L_{01}$ | ½ | Rm + (Im − Rm)/(½) |
| $L_{02}$ | 0 | Im |
| $L_{03}$ | ½ | Im + (Rm1 − Im) × (½) |
| $L_1$ | 0 | Rm1 |
| $L_{11}$ | ½ | Rm1 + (Im − Rm1) × (½) |

FIG. 8 illustrates the case in which a magnifying power n is 5. The interpolating signal which is the output of the second field memory 13 is not outputted as it is. This is different from the case in which a magnifying power n is an even number. The coefficient value, which is the output of the coefficient generating means 24 and the value of the magnified video signal output are shown in TABLE 2.

TABLE 2

| scanning line no. | coefficient | magnified video signal |
|---|---|---|
| $L_0$ | 0 | Rm |
| $L_{01}$ | 2/5 | Rm + (Im − Rm) × (2/5) |
| $L_{02}$ | 4/5 | Rm + (Im − Rm) × (4/5) |
| $L_{03}$ | 1/5 | Im + (Rm1 − Rm) × (1/5) |
| $L_{04}$ | 3/5 | Im + (Rm1 − Rm) × (3/5) |
| $L_1$ | 0 | Rm1 |
| $L_{11}$ | 2/5 | Rm1 + (Im1 − Rm1) × (2/5) |
| $L_{12}$ | 4/5 | Rm1 + (Im1 − Rm1) × (4/5) |

According to the above two exemplary embodiments, by providing a first switching means 20 and a second switching means 21 for switching between a magnified original signal and a magnified interpolating signal, a subtracting means 22 for subtracting the output of the first switching means 20 from the output of the second switching means 21, a coefficient generating means 24, a multiplying means for multiplying the output of the subtracting means 22 and the output of the coefficient generating means 24, and an adding means 25 for adding the output of the first switching means 20 and the output of the multiplying means 23, interpolation can be done linearly between an original video signal and an interpolating video signal and a vertical stepping signal is made smooth and a more natural magnified picture can be reproduced.

(Fourth Exemplary Embodiment)

In a fourth exemplary embodiment of the present invention, a function is added for making an output of the coefficient generating means 24 always zero, in other words, for making an output of the multiplying means 23 always zero. A block diagram and functional explanation of this embodiment are omitted.

Figure 9:
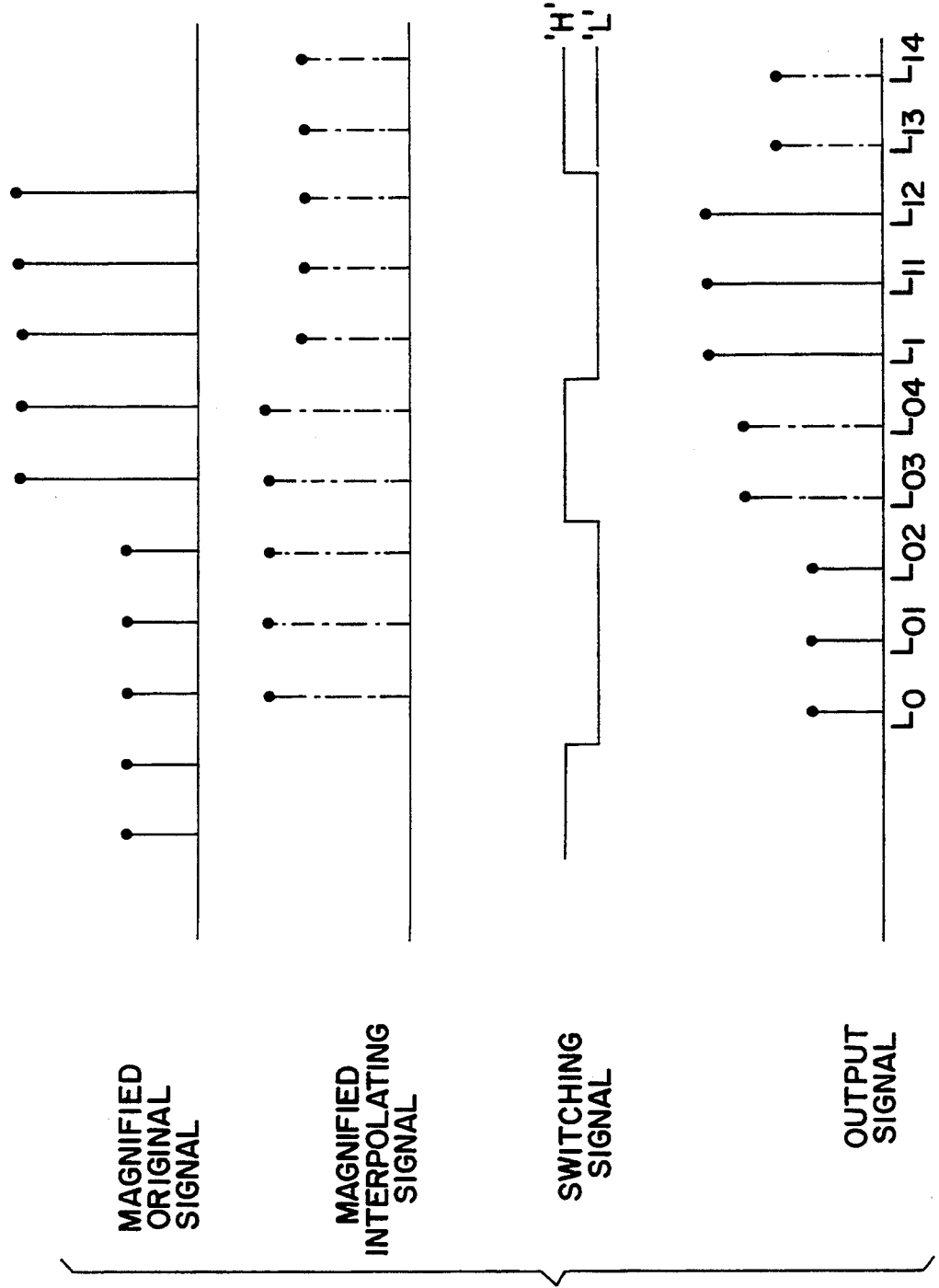
FIG. 9 are graphs which illustrate signal processing procedures. These graphs are useful for explaining the performance of a video signal processing apparatus in accordance with a fourth exemplary embodiment of the present invention.

Video signals in the case of 5-power magnification are shown in FIG. 9. The output values of the coefficient generating means 24 and the magnified video signal for each scanning lines are shown in TABLE 3.

TABLE 3

| scanning line no. | coefficient | magnified video signal |
|---|---|---|
| $L_0$ | 0 | Rm |
| $L_{01}$ | 0 | Rm |
| $L_{02}$ | 0 | Rm |
| $L_{03}$ | 0 | Im |
| $L_{04}$ | 0 | Im |
| $L_1$ | 0 | Rm1 |
| $L_{11}$ | 0 | Rm1 |
| $L_{12}$ | 0 | Rm1 |
| $L_{13}$ | 0 | Im |
| $L_{14}$ | 0 | Im |

According to the fourth exemplary embodiment, linear interpolation (as in the third exemplary embodiment) can be selectively used. This function is provided because, although linear interpolation makes a more natural magnified picture, the picture is of inferior sharpness compared with a picture without linear interpolation.

According to a video signal processing apparatus in accordance with the first and the second exemplary embodiments, the magnified picture is improved in vertical resolution and in picture quality, because the original video signal and the interpolating video signal processed with three dimensional scanning line interpolation are switched between each other and displayed on the screen.

According to a video signal processing apparatus in accordance with the second exemplary embodiment, switching from a magnified picture to a standard picture or vice versa can be done without losing synchronization.

According to a video signal processing apparatus in accordance with the third and the fourth exemplary embodiments, a vertical stepping signal is made smooth. Therefore, a more natural magnified picture can be reproduced by interpolating linearly between an original video signal and an interpolating video signal employing operational process.

According to a video signal processing apparatus in accordance with the fourth exemplary embodiment, a more natural magnified picture can be reproduced by linear interpolation, and also a sharp picture can be obtained by making the output of the adding means always zero (i.e. not performing linear interpolation).

The invention may be embodied in other specific form without departing from the spirit or essential characteristics thereof. The present embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed:

1. A video signal processing apparatus comprising,

A/D converter means for converting an analog video signal to a digital video signal, three dimensional scanning line interpolating means for interpolating scanning lines in three dimensions from said digital video signal and for generating an interpolating video signal, magnification processing means, including a) a first field memory for storing said digital video signal and b), a second field memory for storing said interpolating video signal, for magnifying each of said digital video signal stored in said first field memory and said interpolating video signal stored in said second field memory to generate a magnified digital video signal and a magnified interpolating video signal respectively, a controller for controlling the magnification processing means when the magnification processing means magnifies each of said digital video signal stored in said first field memory and said interpolating video signal stored in said second field memory to generate said magnified digital video signal and said magnified interpolating video signal respectively, switching signal generating means for generating a switching signal according to a vertical magnifying power, first switching means for switching between said magnified digital video signal and said magnified interpolating video signal according to said switching signal to generate a first switching means output signal which is one of said magnified digital video signal and said magnified interpolating video signal, second switching means for switching between said magnified digital video signal and said magnified interpolating video signal according to said switching signal from said switching signal generating means and for outputting a second switching means output signal which is the other of said magnified digital video signal and said magnified interpolating video signal, subtracting means for subtracting said second switching means output signal from said first switching means output signal to generate a subtracting means output signal, coefficient generating means for generating a coefficient signal which is a function of said vertical magnifying power, multiplying means for multiplying the subtracting means output signal and the coefficient signal to generate a multiplying means output signal, and adding means for adding the first switching means output signal and the multiplying means output signal to generate a processed video signal.

2. A video signal processing apparatus as recited in claim 1, further including third switching means for switching the multiplying means output signal to zero.

* * * * *